N. CORNFIELD.
VEHICLE WHEEL.
APPLICATION FILED AUG. 10, 1911.
1,158,183.
Patented Oct. 26, 1915.
2 SHEETS—SHEET 1.
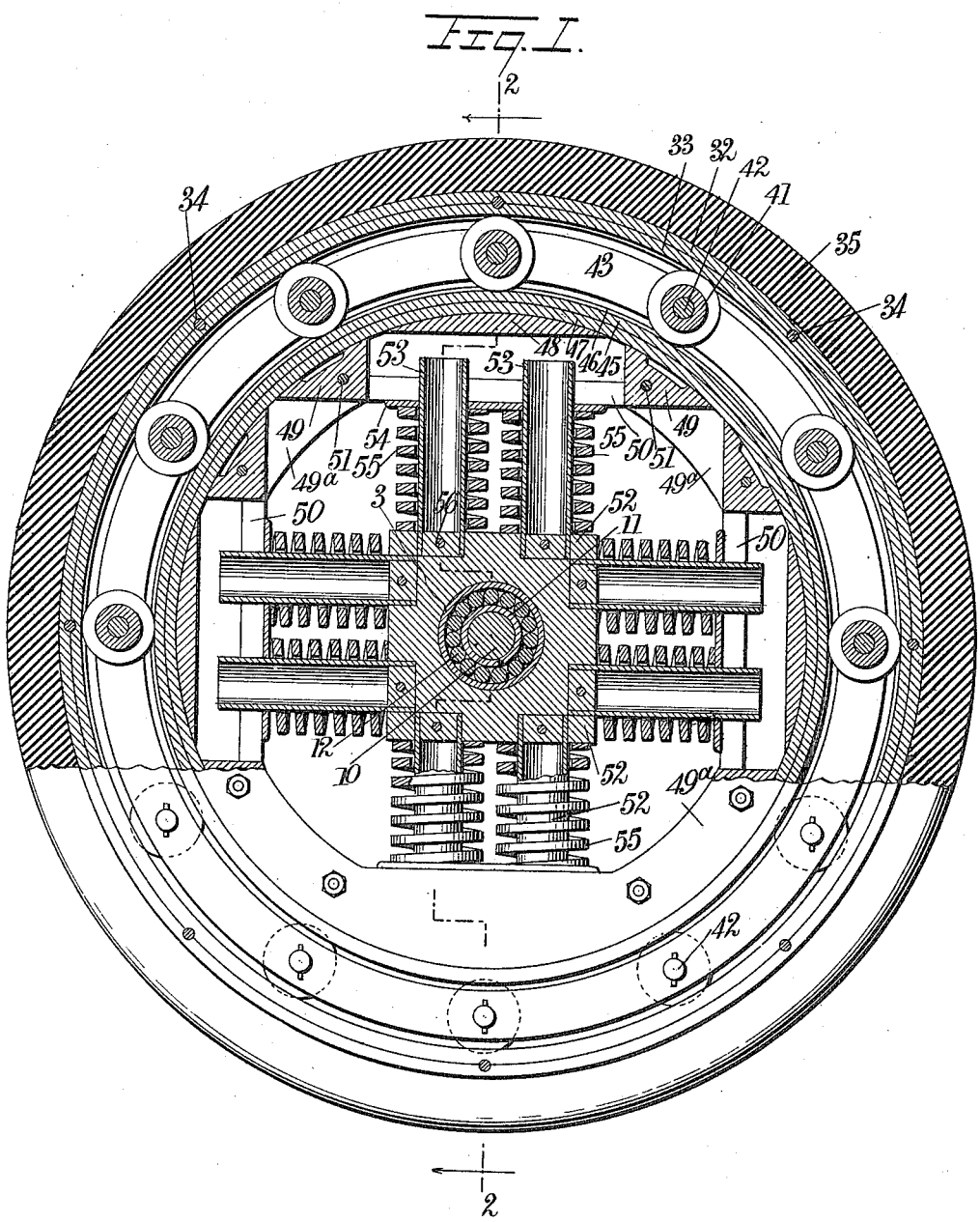
Fig. I.
WITNESSES
H. J. Walker
Walton Harrison
INVENTOR
Noah Cornfield
BY Munn & Co.
ATTORNEYS N. CORNFIELD.
VEHICLE WHEEL.
APPLICATION FILED AUG. 10, 1911.
1,158,183.
Patented Oct. 26, 1915.
2 SHEETS—SHEET 2.
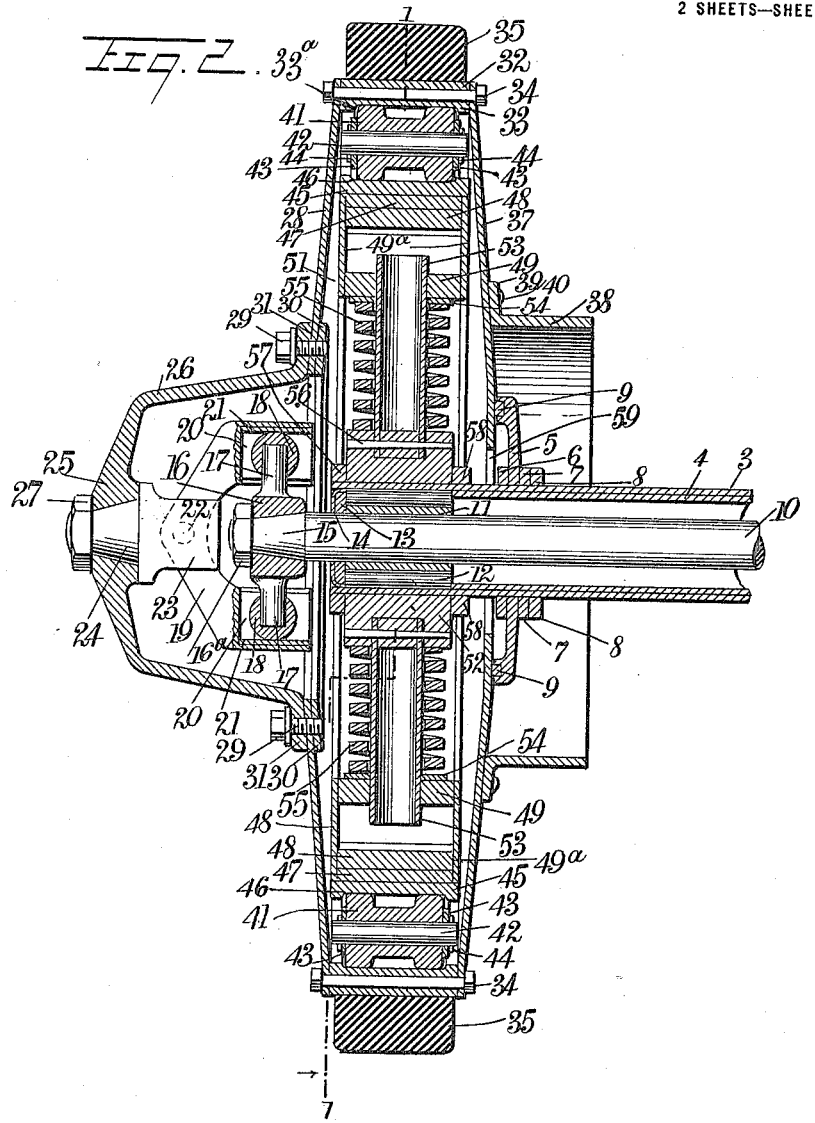
WITNESSES
H. J. Walker
Walton Harrison
INVENTOR
Noah Cornfield
BY
ATTORNEYS ively made of felt.
UNITED STATES PATENT OFFICE.

NOAH CORNFIELD, OF NEW YORK, N. Y.

VEHICLE-WHEEL.

1,158,183.   Specification of Letters Patent.   Patented Oct. 26, 1915.

Application filed August 10, 1911. Serial No. 643,331.

*To all whom it may concern:*

Be it known that I, NOAH CORNFIELD, a citizen of the United States, and a resident of the city of New York, borough of Manhattan, in the county and State of New York, have invented a new and Improved Vehicle-Wheel, of which the following is a full, clear, and exact description.

My invention relates to vehicle wheels and more particularly to vehicle wheels of a type suitable for automobiles and other road vehicles.

More particularly stated, I seek to improve the general efficiency of wheels of this kind by connecting together a number of separate improvements for the purpose of introducing a maximum of strength and flexibility, and a minimum of weight together with positiveness of action and general reliability.

Reference is to be had to the accompanying drawings forming a part of this specification in which like characters of reference indicate corresponding parts in both views, and in which—

Figure 1 is a section on the line 1—1 of Fig. 2, looking in the direction of the arrow, and showing the construction of my improved spring wheel; and Fig. 2 is a section on the line 2—2 of Fig. 1, looking in the direction of the arrow.

A sleeve 3 is fitted internally with another sleeve 4, the two sleeves together constituting an axle casing of tubular form. Encircling this axle casing is a plate 5 having generally an annular form and held in position by nuts 6, 7, 8, the nut 8 serving as a nut lock for holding the nut 7 and preventing it from turning. The plate 5, when locked upon the axle casing by aid of the nuts 6, 7, 8, is rigid in position. The plate 5 carries an annular packing 9 sunken within its face, as indicated in Fig. 2, and preferably made of felt.

An axle 10 extends through the tubular axle casing, and is not only adapted to turn within the casing, but is also movable bodily in a direction diametrical to the axis thereof. The axle 10, because of its freedom of movement relatively to the axle casing, I designate as a "floating" axle. Encircling the axle 10 and secured rigidly upon it is a wearing sleeve 11. Encircling the wearing sleeve 11 is a circular group of rollers 12, the latter being encircled by one end of the sleeve 3 of the axle casing. A ring 13 is secured firmly upon the axle 10 and carries a cup-shaped member 14 of leather. The rollers 12, wearing sleeve 11, and parts immediately adjacent to these, together constitute a roller bearing for enabling the axle 10 to turn easily in relation to the axle casing. The axle 10 is provided with a conical portion 15, and fitted upon the latter is a spider 16, a nut 16ª being provided for the purpose of holding the spider firmly in position. The spider 16 is provided with necks 17, the latter carrying ball heads 18.

A lever 19 having generally a U-shaped form, as indicated in Fig. 2, is provided with slots 20 into which the ball heads 18 are fitted, and located within the slots 20 are wearing plates 21 against which the heads 18 are free to slide. The lever 19 is, by aid of a pivot pin 22, mounted upon a boss 23. The latter is provided with a conical portion 24 which extends through a bearing 25 and is engaged by a nut 27. By aid of this nut the boss 23 is securely held upon the bearing 25. This bearing is integral with a conical casing 26 commonly designated in this art as a "hub." The casing 26 is secured to an annular plate 28 by aid of bolts 29 and a ring 30. The bolts 29 extend through the outer edge 31 of the casing 26 which is flattened slightly, and also extend through the inner edge of the plate 28 and through the ring 30, thus holding these parts securely and rigidly together.

Engaging the outer edge of the plate 28 are two rings 32, 33 disposed concentrically to each other. Bolts 34 extend through the plate 28 and between the rings 32, 33, these rings being recessed so as to fit neatly around the bolts 34, as will be understood from Fig. 1. A tire 35 encircles the outermost ring 32 and may be a standard tire. The ring 33 is provided internally with a groove 33ª. Engaging the rings 32, 33, and held by the bolts 34, is a plate 37, and mounted upon the latter is a brake drum 38 having a general annular form and provided with a flange 39, the latter being secured upon the plate 37 by rivets 40. The brake drum 38 is used for the purpose of engaging a brake band (not shown) in order that the rotation of the wheel may be stopped by brake action.

A number of rollers 41 is disposed within the ring 33 and extends slightly into the groove 33ª thereof. These rollers 41 are mounted upon roller shafts 42 and are disposed between rings 43. Pins 44 extend diametrically through the shafts 42 and prevent the removal of the rings 43. These rings and the rollers 42 are thus held together in the general form of a circle. Disposed just inside of this circle and concentric to the same is a ring 45 which is provided externally with a groove 46 into which the rollers 41 extend slightly. The ring 45 is secured to a ring 47 which is concentric to it. Mounted within the ring 47 and spaced apart are four plates 48. These plates are spaced equi-distant within the ring 47, the four inner faces of the four plates 48 being severally at right angles to each other, as will be understood from Fig. 1. Disposed within the ring 47 is a number of trusses 49 which are severally provided with slots 50, these slots extending in the general direction of the plane of the wheel and being bounded in part by the inner surfaces of the respective plates 48. The plates 48, trusses 49 and ring 47 are slightly narrower than the ring 45, and are clamped between two disk rings 49ª the latter being held in position by bolts 51.

Mounted firmly upon the sleeve 3 is a head 52 angular in general form. Mounted upon this head and extending from it is a number of tubular guides 53 of tough steel or other appropriate metal. These guides are arranged in pairs as indicated in Fig. 1, the respective guides being so mounted that one pair extends in each direction represented by a face of the head 52; that is to say, there being four of these faces, there are four pairs of guides 53, one pair extending upwardly, another pair forwardly, another pair downwardly, and another pair backwardly, from the head 52, these directions being reckoned in the general plane of the wheel. Each pair of guides 53 extends loosely through a wearing plate 54. Each wearing plate 54 is engaged by a pair of spiral springs 55. These springs are so-called "compression" springs, and have each the form of a spiral, the convolutions of which are rectangular or ribbon-like in cross section. The guides 53 extend slightly into the head 52 and are held firmly in position by aid of cross pins 56. The head 52 is secured in position upon the sleeve 3 by aid of annular nuts 57, 58, as will be understood from Fig. 2.

The wheel herein shown and described is the rear wheel of an automobile, but I do not limit myself on this account, as many of the features disclosed are capable of application to wheels of other kinds.

The operation of my device is as follows: Power being applied to the floating shaft 10, the spider 16 turns the lever 19 and this turns the boss 23, thus causing the rotation of the hub 26, and the hub carries with it the plates 28, 37, tire 35, and in fact all parts outside of the circle of rollers 41. The plate 5 does not turn because it is secured upon the axle casing; hence the felt packing 9 rubs against the plate 37 as the latter turns, and no dust, dirt or water can find its way into the wheel on account of the felt packing 9. The wheel may be partially filled with oil, and this oil cannot escape but is caused to flow into the various ramifications within the wheel so as to keep every part lubricated. When the wheel is to be stopped by brake action, a brake band is pressed upon the brake member 38. The spider 16 and the lever 19 are flexible relatively to each other so that the axle 10 may have reasonable freedom of motion within the axle casing. The tubular guides 53 maintain the revoluble parts of the wheel in a predetermined plane relatively to the non-revoluble parts of the wheel so that the wheel, as a whole, always maintains its position strictly at right angles to the longitudinal axis of the tubular axle casing. The alinement of the wheel is, therefore, maintained at all times and is independent of the play of the floating shaft 10.

Whenever, owing to the vicissitudes of travel, it happens that the pressure due to the weight of the vehicle body is momentarily greater or less than usual, the floating shaft 10 moves upwardly or downwardly, as the case may be, the wheel, however, maintaining, as above explained, its strictly vertical position. Again, if there be a sudden jerk forward or backward relatively to the floating shaft 10, the latter is displaced slightly in a direction forward or backward, as the case may be, and instantly assumes its normal position in the center of the wheel. I find that the head 52 and all non-revoluble parts associated therewith have a slight tendency to rock whenever the strain upon the vehicle body is suddenly increased or diminished in the general direction of travel. I find, moreover, that this rocking motion is very agreeable to the occupants of the vehicle, as it prevents or greatly ameliorates what might otherwise be a shock.

I do not limit myself to any particular materials to be used in the construction of this wheel; nor in all instances to the precise arrangement set up for the several parts, the scope of my invention being commensurate with my claims.

Having thus described my invention what I claim as new and desire to secure by Letters Patent is:—

1. A wheel having a solid tire; a rim for supporting said tire; a full-sided inclosing casing; a non-rotative bearing frame for said rim, said bearing frame having a track member spaced apart from the inner surface of said rim; a plurality of rotary members engaging the track member on said bearing frame and the inner surface of said above-mentioned rim; a hub block mounted in said frame and guided to move therein vertically and horizontally; a plurality of springs interposed between said hub member and said non-rotative frame to normally maintain the hub block concentric in said frame under load conditions; in combination with a rotary axle having a bearing in said hub block; and means rotatively connecting said casing and said axle, said means comprising laterally disposed arms, a spider frame having sockets for said arms, said frame being pivotally mounted upon said casing and in line with the center thereof.

2. In combination with a wheel having a hollow body and a full-sided inclosing casing therefor; a rotary axle extending within said casing; a connection between said casing and said axle, comprising a member fixedly mounted in the end of said axle and having laterally disposed arms; and a spider connection pivotally mounted in said casing exterior to the said axle and in line with the axis thereof, said spider having elongated recesses to hold said laterally disposed arms to permit lengthwise movement thereof.

3. In combination with a wheel having a hollow body and a full-sided inclosing casing therefor; a rotary axle extending within said casing; a connection between said casing and said axle, comprising a member fixedly mounted in the end of said axle and having laterally disposed arms; a spider connection pivotally mounted in said casing exterior to the said axle and in line with the axle thereof, said spider having elongated recesses to hold said laterally disposed arms to permit lengthwise movement thereof; and a resilient connecting frame for said wheel and said axle, embodying a hub block, a track frame and a plurality of interposed spring members arranged to normally maintain said hub block and axle when mounted therein, concentric with said wheel and frame.

In testimony whereof I have signed my name to this specification in the presence of two subscribing witnesses.

NOAH CORNFIELD.

Witnesses:
RALPH T. HARRIS,
WALTON HARRISON.

Copies of this patent may be obtained for five cents each, by addressing the "Commissioner of Patents, Washington, D. C."